United States Patent
Uhr et al.

(10) Patent No.: US 10,679,193 B2
(45) Date of Patent: Jun. 9, 2020

(54) DIGITAL VIRTUAL CURRENCY TRANSACTION SYSTEM AND METHOD HAVING BLOCK CHAIN BETWEEN CONCERNED PARTIES

(71) Applicant: COINPLUG INC., Seongnam-si, Gyeonggi-do (KR)

(72) Inventors: Joon Sun Uhr, Seongnam-si (KR); Jay Wu Hong, Seoul (KR); Jong Eun Park, Seoul (KR)

(73) Assignee: Coinplug, Inc., Gyeonggi-Do (KR)

( * ) Notice: Subject to any disclaimer, the term of this patent is extended or adjusted under 35 U.S.C. 154(b) by 569 days.

(21) Appl. No.: 15/516,905

(22) PCT Filed: Oct. 7, 2015

(86) PCT No.: PCT/KR2015/010582
§ 371 (c)(1),
(2) Date: Apr. 5, 2017

(87) PCT Pub. No.: WO2016/171349
PCT Pub. Date: Oct. 27, 2016

(65) Prior Publication Data
US 2017/0308872 A1    Oct. 26, 2017

(30) Foreign Application Priority Data
Apr. 20, 2015  (KR) .......................... 10-2015-0055000

(51) Int. Cl.
*G06Q 40/00*    (2012.01)
*G06Q 20/06*    (2012.01)
(Continued)

(52) U.S. Cl.
CPC ....... *G06Q 20/065* (2013.01); *G06F 16/9566* (2019.01); *G06Q 20/06* (2013.01);
(Continued)

(58) Field of Classification Search
None
See application file for complete search history.

(56) References Cited

U.S. PATENT DOCUMENTS

2002/0052846 A1    5/2002   Takatsu
2015/0262176 A1*   9/2015   Langschaedel ...... G06Q 20/363
                                                          705/71
(Continued)

FOREIGN PATENT DOCUMENTS

KR        10-0709726 B1    4/2007
KR     10-2010-0002784 A   1/2010
(Continued)

OTHER PUBLICATIONS

Naver Blog, "Digital Virtual Currency! What is Bitcoin?", URL:http://blog.naver.com/npl12345/220295650045, Mar. 10, 2015.
(Continued)

*Primary Examiner* — Olabode Akintola
(74) *Attorney, Agent, or Firm* — Husch Blackwell LLP

(57) ABSTRACT

The present invention relates to a digital virtual currency transaction system and method which enable a receiver to make digital virtual currency transactions having a block chain regardless of whether an electronic wallet has been opened, and which have a block chain between concerned parties to guide the concerned parties to be able to conveniently make URL-based transactions without recognizing a public address comprised of 32 bytes or more for every digital virtual currency transaction having a block chain between concerned parties. Provided are a system and a method using same, the system comprising: a block chain-based digital virtual currency transaction guide server (100); a giver terminal (200) which is loaded with a giver-side block chain-based digital virtual currency transaction app (210), generates a giver transaction request signal; and a
(Continued)

receiver terminal 300 which clicks the receiver transaction selecting URL (A).

13 Claims, 11 Drawing Sheets

(51) Int. Cl.
    *G06F 16/955*     (2019.01)
    *G06Q 20/38*     (2012.01)
    *G06Q 20/40*     (2012.01)
    *G06Q 20/36*     (2012.01)

(52) U.S. Cl.
    CPC ........... *G06Q 20/36* (2013.01); *G06Q 20/363* (2013.01); *G06Q 20/3678* (2013.01); *G06Q 20/38* (2013.01); *G06Q 20/389* (2013.01); *G06Q 20/40* (2013.01); *G06Q 20/4014* (2013.01)

(56) References Cited

U.S. PATENT DOCUMENTS

| | | | | |
|---|---|---|---|---|
| 2015/0348017 A1* | 12/2015 | Allmen | ................ | G06Q 20/367 705/76 |
| 2015/0356555 A1* | 12/2015 | Pennanen | .............. | G06Q 20/06 705/71 |
| 2015/0363777 A1* | 12/2015 | Ronca | .................. | G06Q 20/401 705/75 |
| 2015/0363778 A1* | 12/2015 | Ronca | .................. | G06Q 20/065 705/71 |

FOREIGN PATENT DOCUMENTS

| | | |
|---|---|---|
| KR | 10-2012-00028519 A | 3/2012 |
| KR | 10-1344465 B1 | 12/2013 |

OTHER PUBLICATIONS

Internet News, "Popular Mobile Application for Bitcoin", URL:http://m.zdnet.co.kr/news_view.asp?article_id=20131220112759, Dec. 20, 2013.

International Search Report of PCT/2015/010582 dated Oct. 7, 2015.

* cited by examiner

DIGITAL VIRTUAL CURRENCY TRANSACTION SYSTEM AND METHOD HAVING BLOCK CHAIN BETWEEN CONCERNED PARTIES

TECHNICAL FIELD

The present invention relates to a transaction system and method for a digital virtual currency having a block chain between concerned parties which enable a receiver to do a transaction of a digital virtual currency having a block chain regardless of whether an electronic wallet has been created, and guide the concerned parties to conveniently do a uniform resource locator (URL)-based transaction without recognizing a public address composed of 32 bytes or more for each transaction of a digital virtual currency having a block chain between the concerned parties.

BACKGROUND ART

Referring to an apparatus and method of purchasing commodities in an online game as a deputy using virtual currency for a manager in the internet café which was made public (Korean Patent Publication No. 10-2012-0028519) by the Korean Intellectual Property Office, a virtual currency in common use can be generally used to only purchase an item, etc. in Internet-based online games, and therefore, there is a problem with use of the virtual currency.

Here, Bitcoin which is a kind of virtual currency available for payment for goods is suggested as has lately been spotlighted.

Bitcoin is a digital currency invented by Satoshi Nakamoto in 2009, and there is no central apparatus that issues and manages the currency. However, a Bitcoin transaction is realized by a distributed database (DB) based on a peer-to-peer (P2P) network and is performed according to public key cryptography.

Bitcoin involving such a payment method can be used without information, such as a credit card number, a valid date, a credit card verification (CCV) number, etc. required for credit card payment, and thus has merits in that there is a very low probability of theft and a usage fee is also low.

In addition, Bitcoin is stored in the form of a wallet file. A unique address thereof, that is, a public address, and a private key corresponding to a password are assigned to this wallet, and a product purchase with Bitcoin is made on the basis of the address referred to as public address.

Digital virtual currencies available for payment for goods include Litecoin, Darkcoin, Namecoin, Dogecoin, Ripple, etc. together with Bitcoin. Since these digital virtual currencies have in common characteristic in that a block chain in which information on a transaction done by a purchaser with a digital virtual currency including Bitcoin is collected and stored is stored in an electronic wallet, Bitcoin, Litecoin, Darkcoin, Namecoin, Dogecoin, and Ripple are collectively referred to as digital virtual currencies having a block chain.

To use a digital virtual currency having such a block chain having a payment characteristic, a user subscribes to a Bitcoin exchange (e.g., www.coinplug) first, creates an electronic wallet, and charges Korean Won (KRW) corresponding to the amount of Korean currency.

Subsequently, the user checks a current price of Bitcoin traded in the Bitcoin exchange and then makes a purchase order by inputting the amount and the current price of a desired digital virtual currency having a block chain. Then, the deal is closed through a purchase order which satisfies trade conditions, so that the user can make payment with the digital virtual currency having a block chain to purchase a product.

However, due to such a transaction characteristic of a digital virtual currency having a block chain, it is not possible to a provide consumer-to-consumer (C2C) transaction that is a basic function of a general currency commonly used in each country including Republic of Korea.

In other words, if both concerned parties want to do a transaction of a digital virtual currency having a block chain, an existing transaction system based on a digital virtual currency having a block chain enables the transaction only when both a person who gives the digital virtual currency having a block chain (referred to as a giver below) and a person who receives the digital virtual currency having a block chain (referred to as a receiver below) create electronic wallets required to do a transaction of the digital virtual currency having a block chain.

Moreover, in the existing transaction system based on a digital virtual currency having a block chain, even when both the concerned parties have electronic wallets, a giver should first input and provide a public address used as an identification means for a transaction of a digital virtual currency having a block chain together with input and provision of a public address of the receiver for the transaction of a digital virtual currency having a block chain between both concerned parties.

Here, the public addresses are about 32 to about 35 byte data composed of numerals and English alphabet lower and upper case letters, such as "1BBe23rvzYBwaAqckvj4TTTJAs3W78dUpx."

For this reason, there are numerous cases in which a giver cannot recognize a public address of a receiver in practice.

Therefore, for a product transaction with a digital virtual currency having a block chain, payment is made using a quick response (QR) code for Bitcoin payment obtained by converting a public address into a QR code. However, when the QR code for Bitcoin payment is applied to a transaction between both concerned parties, it is inconvenient to previously receive separate QR codes for Bitcoin payment of all other parties who will receive a digital virtual currency having a block chain, and it is also necessary to do the transaction of a digital virtual currency having a block chain while capturing the transaction. Consequently, the process is complicated, and there is also a risk of illegal use when a giver leaks previously provided QR codes for Bitcoin payment of receivers to the outside.

DISCLOSURE

Technical Problem

The present invention is proposed to solve the problems of related art and directed to providing a transaction system and method for a digital virtual currency having a block chain between concerned parties which guide a receiver to do a transaction of a digital virtual currency having a block chain regardless of whether an electronic wallet has been created.

The present invention is also directed to providing a transaction system and method for a digital virtual currency having a block chain between concerned parties which guide concerned parties to conveniently do a uniform resource locator (URL)-based transaction without recognizing a public address composed of 32 bytes or more for each transaction of a digital virtual currency having a block chain between the concerned parties.

Technical Solution

One aspect of the present invention provides a transaction system and method for a digital virtual currency having a block chain between concerned parties, including a block chain-based digital virtual currency transaction guide server configured to, when a transaction request signal for a giver including amount information of a digital virtual currency having a block chain to be given and personal information of a giver is received, generate and transmit a receiver transaction selecting uniform resource locator (URL) for guiding a receiver to do the transaction of a digital virtual currency having a block chain regardless of whether an electronic wallet has been created as required when the receiver makes the transaction of a digital virtual currency having a block chain, and transmit a receiver transaction guide screen provided through a click of the receiver transaction selecting URL and guiding the receiver to do the transaction of the digital virtual currency having a block chain differently according to whether the receiver has created an electronic wallet; a giver terminal configured to generate the transaction request signal for a giver including the amount information of the digital virtual currency having a block chain to be given and the personal information of the giver and transmit the transaction request signal for a giver to the digital virtual currency transaction guide server, and in which a giver-side block chain-based digital virtual currency transaction app for guiding a giver to designate the receiver who will receive the receiver transaction selecting URL transmitted from the digital virtual currency transaction guide server and transmit the receiver transaction selecting URL is installed; and a receiver terminal configured to click the receiver transaction selecting URL received from the giver terminal and thereby request payment of the digital virtual currency having a block chain differently according to whether the electronic wallet has been created through the receiver transaction guide screen received from the block chain-based digital virtual currency transaction guide server.

The present invention, a transaction system and method for a digital virtual currency having a block chain between concerned parties, includes block chain retention servers configured to authenticate, when transaction information for a transaction of a digital virtual currency having a block chain is received, a block chain-based digital virtual currency transaction by verifying the received transaction information for a transaction of a digital virtual currency having a block chain, and retain a block chain in which the transaction information for a transaction of a digital virtual currency having a block chain is recorded according to the authentication, wherein the block chain-based digital virtual currency transaction guide server includes a database (DB) unit having a membership list information DB storing personal information of members including the members' e-mail accounts, passwords, phone numbers of mobile communication terminals, and addresses separately according to the members as information registered for a block chain-based digital virtual currency transaction when users become the members, an electronic wallet list information DB storing electronic wallets including public addresses of a digital virtual currency having a block chain created by the users who have become the members, private keys, and block chain-based digital virtual currency amount information separately according to the members, and a format list information DB storing the receiver transaction guide screen, the receiver transaction guide screen has an electronic wallet creation-specific payment selection list unit for requesting payment of a digital virtual currency having a block chain differently according to whether an electronic wallet has been created, the electronic wallet creation-specific payment selection list unit includes an electronic wallet creation request item used by a receiver who has not created an electronic wallet to request creation of an electronic wallet, the electronic wallet creation request item has a receiver personal information input window unit for creating an electronic wallet in which receiver-related information required to create an electronic wallet is input and displayed, as a window additionally displayed when the electronic wallet creation request item is selected, the receiver terminal collects and processes information input in the receiver personal information input window unit for creating an electronic wallet into electronic wallet-creating receiver information and transmits the processed electronic wallet-creating receiver information to the virtual currency transaction guide server, and the virtual currency transaction guide server creates an electronic wallet of the receiver based on the received electronic wallet-creating receiver information, stores the electronic wallet in the electronic wallet list information DB, subtracts the amount to be given to the receiver from block chain-based digital virtual currency amount information stored in electronic wallet information of the giver in the electronic wallet list information DB based on the transaction request signal for a giver, adds the subtracted amount to block chain-based digital virtual currency amount information stored in electronic wallet information of the receiver, generates transaction information for a digital virtual currency transaction based on the subtraction and addition, and then controls the transaction information for a digital virtual currency transaction to be propagated to the block chain retention servers.

The present invention, a transaction system and method for a digital virtual currency having a block chain between concerned parties, includes block chain retention servers configured to authenticate, when transaction information for a transaction of a digital virtual currency having a block chain is received, a block chain-based digital virtual currency transaction by verifying the received transaction information for a transaction of a digital virtual currency having a block chain, and retain a block chain in which the transaction information for a transaction of a digital virtual currency having a block chain is recorded according to the authentication, wherein the block chain-based digital virtual currency transaction guide server includes a database (DB) unit having a membership list information DB storing personal information of members including the members' e-mail accounts, passwords, phone numbers of mobile communication terminals, and addresses separately according to the members as information registered for a block chain-based digital virtual currency transaction when users become the members, an electronic wallet list information DB storing electronic wallets including public addresses of a digital virtual currency having a block chain created by the users who have become the members, private keys, and block chain-based digital virtual currency amount information separately according to the members, and a format list information DB storing the receiver transaction guide screen, the receiver transaction guide screen has an electronic wallet creation-specific payment selection list unit for requesting payment of a digital virtual currency having a block chain differently according to whether an electronic wallet has been created, the electronic wallet creation-specific payment selection list unit includes a member login request item used by a receiver who is managed as a member in the block chain-based digital virtual currency transaction guide server to request login to the block chain-based digital virtual currency transaction guide server, the member login request item has a receiver login input window unit in which receiver login information required by a member for login is input and displayed, as a window additionally displayed when the member login request item is selected, the receiver terminal collects and processes information input in the receiver login input window unit into member login information for a receiver and transmits the processed member login information for a receiver to the virtual currency transaction guide server, and the virtual currency transaction guide server confirms that the receiver is a member by matching the received member login information for a receiver with the membership list information DB, subtracts the amount to be given to the receiver from block chain-based digital virtual currency amount information stored in electronic wallet information of the giver in the electronic wallet list information DB based on the transaction request signal for a giver, adds the subtracted amount to block chain-based digital virtual currency amount information stored in electronic wallet information of the receiver, generates transaction information for a digital virtual currency transaction based on the subtraction and addition, and then controls the transaction information for a digital virtual currency transaction to be propagated to the block chain retention servers.

The present invention, a transaction system and method for a digital virtual currency having a block chain between concerned parties, includes block chain retention servers configured to authenticate, when transaction information for a transaction of a digital virtual currency having a block chain is received, a block chain-based digital virtual currency transaction by verifying the received transaction information for a transaction of a digital virtual currency having a block chain, and retain a block chain in which the transaction information for a transaction of a digital virtual currency having a block chain is recorded according to the authentication, wherein the block chain-based digital virtual currency transaction guide server includes a database (DB) unit having a membership list information DB storing personal information of members including the members' e-mail accounts, passwords, phone numbers of mobile communication terminals, and addresses separately according to the members as information registered for a block chain-based digital virtual currency transaction when users become the members, an electronic wallet list information DB storing electronic wallets including public addresses of a digital virtual currency having a block chain created by the users who have become the members, private keys, and block chain-based digital virtual currency amount information separately according to the members, and a format list information DB storing the receiver transaction guide screen, the receiver transaction guide screen has an electronic wallet creation-specific payment selection list unit for requesting payment of a digital virtual currency having a block chain differently according to whether an electronic wallet has been created, the electronic wallet creation-specific payment selection list unit includes a non-member electronic wallet information input request item for requesting manual input of a public address of a receiver having an electronic wallet, the non-member electronic wallet information input request item has a receiver public address input window in which a public address included in an electronic wallet of the receiver is input and displayed, as a window additionally displayed when the non-member electronic wallet information input request item is selected, the receiver terminal transmits receiver public address information for a non-member input in the receiver public address input window to the virtual currency transaction guide server, and the virtual currency transaction guide server extracts electronic wallet information of the giver from the electronic wallet list information DB based on the transaction request signal for a giver, subtracts the amount to be given to the receiver from block chain-based digital virtual currency amount information stored in the extracted electronic wallet information of the giver, stores the electronic wallet information of the giver, generates transaction information for a digital virtual currency transaction based on the electronic wallet information of the giver stored after the subtraction and the received receiver public address information for a non-member, and controls the transaction information for a digital virtual currency transaction to be propagated to the block chain retention servers.

The giver-side block chain-based digital virtual currency transaction app of the giver terminal adds selection information of a URL transmission means, which is selected by the giver as a means of transmitting the receiver transaction selecting URL from among an instant messenger, a short message service (SMS), and e-mail, to the transaction request signal for a giver, transmits the transaction request signal for a giver, controls the means selected by the giver from among an instant messenger, an SMS, and e-mail to be automatically executed when the receiver transaction selecting URL is received from the digital virtual currency transaction guide server, and outputs the receiver transaction selecting URL in the automatically executed means, so that the giver can transmit the receiver transaction selecting URL to the receiver using the selected means.

The giver terminal stores a block chain-based digital virtual currency transaction screen including an amount display column in which the amount of the digital virtual currency having a block chain to be given is displayed, a transmission means selection column in which an instant messenger, an SMS, and e-mail are displayed and one of the displayed instant messenger, SMS, and e-mail is selected by the giver as the means of transmitting the receiver transaction selecting URL, and a transmission menu for requesting data transmission, and when the transmission menu in the block chain-based digital virtual currency transaction screen is clicked, the giver-side block chain-based digital virtual currency transaction app of the giver terminal collects the amount information of the digital virtual currency having a block chain displayed through the amount display column, the selection information of the URL transmission means selected through the transmission means selection column, and the personal information of the giver and generates the transaction request signal for a giver.

The digital virtual currency having a block chain is any one of Bitcoin, Litecoin, Darkcoin, Namecoin, Dogecoin, and Ripple.

A transaction method for a digital virtual currency having a block chain between concerned parties is possible, regardless of whether the receiver has created an electronic wallet needed in virtual currency transaction using the present invention, including step of executing a giver-side block chain-based digital virtual currency transaction app run in a giver terminal; step of displaying, by the executed giver-side block chain-based digital virtual currency transaction app, a block chain-based digital virtual currency transaction screen in the giver terminal; step of generating, by the giver-side block chain-based digital virtual currency transaction app, a transaction request signal for a giver including amount information of a digital virtual currency input through the block chain-based digital virtual currency transaction screen, selection information of a uniform resource locator (URL) transmission means selected by a giver as a means of transmitting a receiver transaction selecting URL from among an instant messenger, a short message service (SMS), and e-mail, and personal information of the giver, and transmitting the transaction request signal for a giver to a block chain-based digital virtual currency transaction guide server; step of generating, by the block chain-based digital virtual currency transaction guide server, the receiver transaction selecting URL for guiding a receiver who receives the digital virtual currency having a block chain to do a transaction of a digital virtual currency having a block chain regardless of whether the receiver has created an electronic wallet when the transaction request signal for a giver is received from the giver terminal, and transmitting the receiver transaction selecting URL to the giver terminal; step of controlling, by the giver-side block chain-based digital virtual currency transaction app of the giver terminal, a transmission means corresponding to the selection information of the URL transmission means among transmission means including the instant messenger, the SMS, and the e-mail to be automatically executed when the receiver transaction selecting URL is received from the block chain-based digital virtual currency transaction guide server, and controlling the receiver transaction selecting URL to be output in the automatically executed transmission means; step of transmitting, by the automatically executed transmission means, the receiver transaction selecting URL to a receiver terminal corresponding to the receiver when the giver designates the receiver requesting transfer of the receiver transaction selecting URL in the automatically executed transmission means and requests transmission; step of outputting, by the receiver terminal, the received receiver transaction selecting URL through a transmission means identical to the transmission means of the giver terminal; step of requesting, by the receiver terminal, transmission of a receiver transaction guide screen corresponding to the receiver transaction selecting URL from the block chain-based digital virtual currency transaction guide server when the receiver transaction selecting URL on the transmission means is clicked in the receiver terminal, and thereby outputting the receiver transaction guide screen received from the block chain-based digital virtual currency transaction guide server; step of checking which one of an electronic wallet creation request item used by a receiver who has not created an electronic wallet to request creation of an electronic wallet, a member login request item used by a receiver who is managed as a member in the block chain-based digital virtual currency transaction guide server to request login to the block chain-based digital virtual currency transaction guide server, and a non-member electronic wallet information input request item for requesting manual input of a public address of a receiver having an electronic wallet is selected, the receiver transaction guide screen output in the receiver terminal having an electronic wallet creation-specific payment selection list unit for requesting payment of a digital virtual currency having a block chain differently according to whether an electronic wallet has been created, and the electronic wallet creation-specific payment selection list unit displaying the electronic wallet creation request item, the member login request item, and the non-member electronic wallet information input request item; step of generating, by the receiver terminal, electronic wallet-creating receiver information including at least one of receiver name information, receiver e-mail account information, password information, and receiver mobile communication phone number information input through the electronic wallet creation request item when the electronic wallet creation request item is selected from among the electronic wallet creation request item, the member login request item, and the non-member electronic wallet information input request item, and transmitting the electronic wallet-creating receiver information to the virtual currency transaction guide server; step of creating, by the virtual currency transaction guide server, an electronic wallet of the receiver based on the received electronic wallet-creating receiver information, storing the electronic wallet in an electronic wallet list information DB, subtracting an amount to be given to the receiver from block chain-based digital virtual currency amount information stored in electronic wallet information of the giver in the electronic wallet list information DB based on the transaction request signal of a giver, adding the subtracted amount to block chain-based digital virtual currency amount information stored in electronic wallet information of the receiver, generating transaction information for a digital virtual currency transaction based on the subtraction and addition, and transmitting the transaction information for a digital virtual currency transaction to designated block chain retention servers; and step of authenticating, by each of the designated block chain retention servers, the block chain-based digital virtual currency transaction by verifying the received transaction information for a transaction of a digital virtual currency having a block chain when the transaction information for a transaction of a digital virtual currency having a block chain is received, and recording the transaction information for a transaction of a digital virtual currency having a block chain according to the authentication.

The transaction method includes, when the member login request item is selected from among the electronic wallet creation request item, the member login request item, and the non-member electronic wallet information input request item in step of checking which one of the electronic wallet creation request item used by a receiver who has not created an electronic wallet to request creation of an electronic wallet, the member login request item used by a receiver who is managed as a member in the block chain-based digital virtual currency transaction guide server to request login to the block chain-based digital virtual currency transaction guide server, and the non-member electronic wallet information input request item for requesting manual input of a public address of a receiver having an electronic wallet is selected, the receiver transaction guide screen output in the receiver terminal having the electronic wallet creation-specific payment selection list unit for requesting payment of a digital virtual currency having a block chain differently according to whether an electronic wallet has been created, and the electronic wallet creation-specific payment selection list unit displaying the electronic wallet creation request item, the member login request item, and the non-member electronic wallet information input request item: step of generating, by the receiver terminal, member login information for a receiver including e-mail account information for receiver login and password information for login input through the member login request item and transmitting the member login information for a receiver to the virtual currency transaction guide server; step of confirming, by the virtual currency transaction guide server, that the receiver is a member by matching the received member login information for a receiver with a membership list information DB, subtracting the amount to be given to the receiver from the block chain-based digital virtual currency amount information stored in the electronic wallet information of the giver in the electronic wallet list information DB based on the transaction request signal for a giver, adding the subtracted amount to the block chain-based digital virtual currency amount information stored in the electronic wallet information of the receiver, generating transaction information for a digital virtual currency transaction based on the subtraction and addition, and transmitting the transaction information for a digital virtual currency transaction to the designated block chain retention servers; and when the transaction information for a transaction of a digital virtual currency having a block chain is thereafter received, proceeding to step of authenticating, by each of the designated block chain retention servers, the block chain-based digital virtual currency transaction by verifying the received transaction information for a transaction of a digital virtual currency having a block chain and recording the transaction information for a transaction of a digital virtual currency having a block chain according to the authentication.

The transaction method includes, when the non-member electronic wallet information input request item is selected from among the electronic wallet creation request item, the member login request item, and the non-member electronic wallet information input request item in step of checking which one of the electronic wallet creation request item used by a receiver who has not created an electronic wallet to request creation of an electronic wallet, the member login request item used by a receiver who is managed as a member in the block chain-based digital virtual currency transaction guide server to request login to the block chain-based digital virtual currency transaction guide server, and the non-member electronic wallet information input request item for requesting manual input of a public address of a receiver having an electronic wallet is selected, the receiver transaction guide screen output in the receiver terminal having the electronic wallet creation-specific payment selection list unit for requesting payment of a digital virtual currency having a block chain differently according to whether an electronic wallet has been created, and the electronic wallet creation-specific payment selection list unit displaying the electronic wallet creation request item, the member login request item, and the non-member electronic wallet information input request item: step of generating, by the receiver terminal, receiver public address information for a non-member indicating a public address which has been input through the non-member electronic wallet information input request item and is included in the electronic wallet of the receiver and transmitting the receiver public address information for a non-member to the virtual currency transaction guide server; step of extracting, by the virtual currency transaction guide server, the electronic wallet information of the giver from the electronic wallet list information DB based on the transaction request signal for a giver, subtracting the amount to be given to the receiver from the block chain-based digital virtual currency amount information stored in the extracted electronic wallet information of the giver, storing the electronic wallet information of the giver, generating transaction information for a digital virtual currency transaction based on the electronic wallet information of the giver stored after the subtraction and the received receiver public address information for a non-member, and transmitting the transaction information for a digital virtual currency transaction to the designated block chain retention servers; and when the transaction information for a transaction of a digital virtual currency having a block chain is thereafter received, proceeding to step of authenticating, by each of the designated block chain retention servers, the block chain-based digital virtual currency transaction by verifying the received transaction information for a transaction of a digital virtual currency having a block chain and recording the transaction information for a transaction of a digital virtual currency having a block chain according to the authentication.

Advantageous Effects

The present invention has an effect of guiding a receiver to do a transaction of a digital virtual currency having a block chain regardless of whether an electronic wallet has been created. Also, the present invention has an effect of guiding concerned parties to conveniently do a uniform resource locator (URL)-based transaction without recognizing a public address composed of 32 bytes or more for each transaction of a digital virtual currency having a block chain between the concerned parties.

MODES OF THE INVENTION

Figure 1:
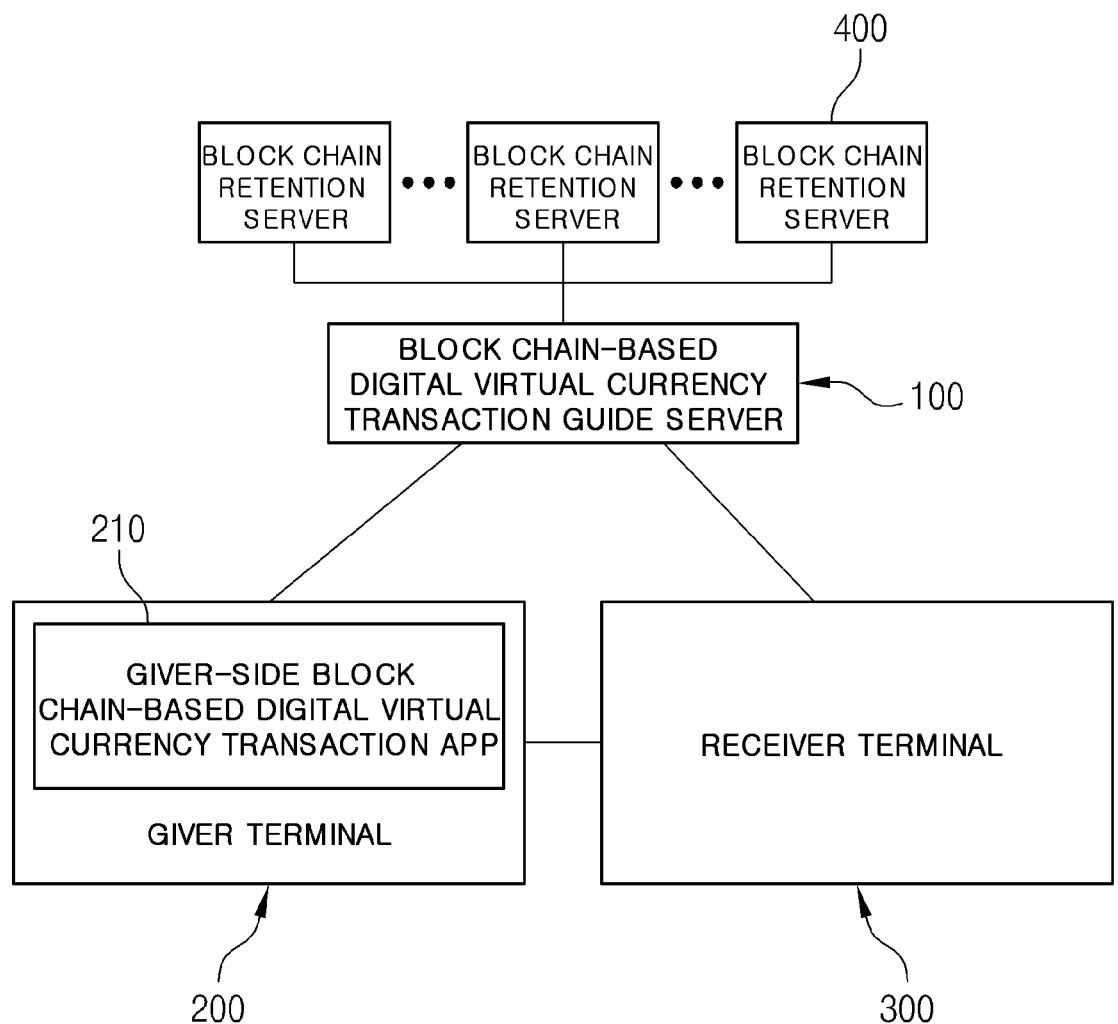
FIG. 1 is a diagram showing an overall configuration of a transaction system for a digital virtual currency having a block chain between concerned parties according to the present invention.
Figure 2:
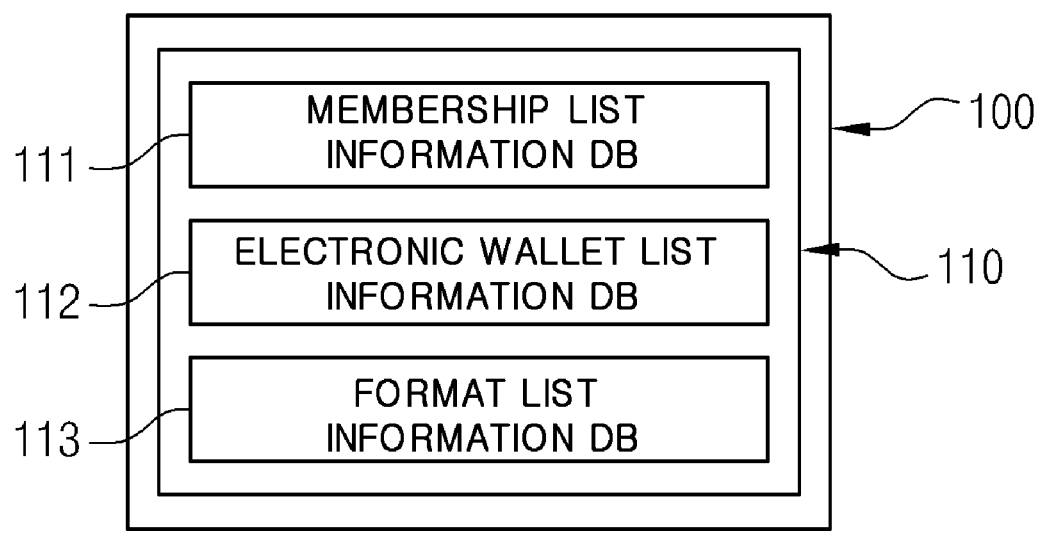
FIG. 2 is a block diagram of a database (DB) unit installed in a block chain-based digital virtual currency transaction guide server among components constituting the transaction system for a digital virtual currency having a block chain between concerned parties according to the present invention.

Hereinafter, configurations and operations of embodiments of the present invention will be described in detail with reference to the accompanying drawings.

As shown in drawings, a transaction system for a digital virtual currency having a block chain between concerned parties according to the present invention includes a block chain-based digital virtual currency transaction guide server 100, a giver terminal 200, a receiver terminal 300, and a plurality of block chain retention servers 400.

First, when transaction information for a transaction of a digital virtual currency having a block chain is received, the plurality of block chain retention servers 400 authenticate a block chain-based digital virtual currency transaction by verifying the received transaction information for a transaction of a digital virtual currency having a block chain, and a block chain in which the transaction information for a transaction of a digital virtual currency having a block chain is recorded according to the authentication is retained in the block chain retention servers 400. The plurality of block chain retention servers 400 are a peer-to-peer (P2P) network-based distributed database (DB), that is, devices constituting a Bitcoin network, which performs a transaction of a digital virtual currency having a block chain through authentication and recording of the transaction of a digital virtual currency having a block chain.

As a component, the block chain retention servers 400 include a block chain-based digital virtual currency transaction guide server 100, which will be described below, administered by a Bitcoin exchange.

Also, propagation of transaction information for a transaction of a digital virtual currency having the block chain is promised in a protocol. When transaction information for a transaction of a digital virtual currency having a block chain is generated, one node (indicating a block chain retention server) propagates the transaction information to designated eight next nodes, and each of the eight nodes receiving the transaction information for a transaction of a digital virtual currency having a block chain further propagates the transaction information to designated eight next nodes. Through this pyramidal propagation, the transaction information is propagated to all block chain retention servers 400 in which a block chain required to perform the transaction of a digital virtual currency having a block chain is retained, so that the propagation is completed.

Meanwhile, a block chain is retained in the block chain retention servers 400. The block chain retention servers 400 may include a server (or terminal) managed by a miner who mines a digital virtual currency having a block chain, or include a user terminal (e.g., a personal computer (PC) or a smart phone) for a transaction of a digital virtual currency having a block chain when an electronic wallet having a block chain is retained in the user terminal.

Digital virtual currencies having such a transaction characteristic with a block chain include Bitcoin, Litecoin, Darkcoin, Namecoin, Dogecoin, Ripple, and so on.

When a transaction request signal for a giver including the amount information of a digital virtual currency having a block chain to be given and personal information of a giver is received, the block chain-based digital virtual currency transaction guide server 100 generates and transmits a receiver transaction selecting URL A for guiding a receiver to do a transaction of a digital virtual currency having a block chain regardless of whether an electronic wallet has been created as required when the receiver makes a transaction of a digital virtual currency having a block chain, transmits a receiver transaction guide screen 600 provided through a click of the receiver transaction selecting URL A to guide the receiver to do the transaction of a digital virtual currency having a block chain differently according to whether the receiver has created an electronic wallet, generates customized transaction information for a digital virtual currency transaction according to whether the receiver has created an electronic wallet, and controls the transaction information for a digital virtual currency transaction to be propagated to the block chain retention servers 400.

In this way, the block chain-based digital virtual currency transaction guide server 100 does not only guide the receiver to do a transaction of a digital virtual currency having a block chain regardless of whether an electronic wallet has been created as required for a transaction of a digital virtual currency having a block chain but also guides the giver and the receiver to conveniently do the transaction of a digital virtual currency having a block chain between concerned parties, which are the giver and the receiver, through the aforementioned receiver transaction selecting URL A without recognizing a public address composed of 32 bytes.

To this end, the block chain-based digital virtual currency transaction guide server 100 includes a DB unit 110 having a membership list information DB 111 storing personal information of members including the members' identities (IDs), passwords, phone numbers of mobile communication terminals, etc., and addresses separately according to the members as information registered for a block chain-based digital virtual currency transaction when users become the members, an electronic wallet list information DB 112 storing electronic wallets including public addresses of a digital virtual currency having a block chain created by the users who have become the members, private keys, and block chain-based digital virtual currency amount information separately according to the members, and a format list information DB 113 storing various kinds of format information including the receiver transaction guide screen 600 that does not only guides the receiver to do a transaction of a digital virtual currency having a block chain regardless of whether an electronic wallet required for a transaction of a digital virtual currency having a block chain has been created but also is required to guide the giver and the receiver to conveniently do the transaction of a digital virtual currency having a block chain between the concerned parties, which are the giver and the receiver, through the aforementioned receiver transaction selecting URL A without recognizing a public address composed of 32 bytes.

Here, the receiver transaction guide screen 600 stored in the format list information DB 113 has an electronic wallet creation-specific payment selection list unit 610 for requesting payment of a digital virtual currency having a block chain differently according to whether an electronic wallet has been created.

The electronic wallet creation-specific payment selection list unit 610 is implemented so that a receiver can do a transaction by selecting a type of guiding a receiver to do a transaction of a digital virtual currency having a block chain without creating an electronic wallet, a type in which a receiver creates an electronic wallet in the block chain-based digital virtual currency transaction guide server 100 and the block chain-based digital virtual currency transaction guide server 100 manages the created electronic wallet, a type in which a receiver creates an electronic wallet in another block chain-based digital virtual currency exchange server (not shown) and the other block chain-based digital virtual currency exchange server manages the electronic wallet.

First, an electronic wallet creation request item 611 displayed in the electronic wallet creation-specific payment selection list unit 610 of a receiver transaction guide screen 600 can be selected for the type of guiding the receiver to do a transaction of a digital virtual currency having a block chain without creating an electronic wallet.

In other words, the electronic wallet creation request item 611 is used by a receiver who has not created an electronic wallet to request creation of an electronic wallet, and has a receiver personal information input window unit for creating an electronic wallet in which receiver-related information required to create an electronic wallet is input and displayed, as a window additionally displayed when the receiver selects the electronic wallet creation request item 611. In the receiver personal information input window unit for creating an electronic wallet, a name input window 611a in which a receiver's name is input and displayed, an e-mail account input window 611b in which a receiver's e-mail account is input and displayed, a password input window 611c in which a password is input and displayed, a contact number input window 611d in which a receiver's mobile communication phone number is input and displayed, and a complete menu 611e are displayed.

Through these windows, the receiver terminal 300 collects and processes receiver name information, receiver e-mail account information, password information, and receiver's mobile communication phone number input in the receiver personal information input window unit for creating an electronic wallet into electronic wallet-creating receiver information and transmits the processed electronic wallet-creating receiver information to a virtual currency transaction guide server 100.

The virtual currency transaction guide server 100 creates an electronic wallet of the receiver on the basis of the received electronic wallet-creating receiver information, stores the electronic wallet in the electronic wallet list information DB 112, subtracts an amount to be given to the receiver from block chain-based digital virtual currency amount information stored in electronic wallet information of a giver in the electronic wallet list information DB 112 on the basis of a transaction request signal for a giver, adds the subtracted amount to block chain-based digital virtual currency amount information stored in electronic wallet information of the receiver, generates transaction information for a digital virtual currency transaction on the basis of the subtraction and addition, and then controls the transaction information for a digital virtual currency transaction to be propagated to the block chain retention servers 400.

Also, a member login request item 612 displayed in the electronic wallet creation-specific payment selection list unit 610 of the receiver transaction guide screen 600 can be selected for the type in which a receiver creates an electronic wallet in the block chain-based digital virtual currency transaction guide server 100 and the block chain-based digital virtual currency transaction guide server 100 manages the created electronic wallet.

In other words, the member login request item 612 is used by a receiver who is managed as a member in the block chain-based digital virtual currency transaction guide server 100 to request login to the block chain-based digital virtual currency transaction guide server 100. The member login request item 612 has a receiver login input window unit in which receiver login information required by a member for login is input and displayed, as a window additionally displayed when the receiver selects the member login request item 612.

In this receiver login input window unit, a login e-mail account input window 612a in which a receiver's e-mail account is input and displayed, a login password input window 612b in which a password is input and displayed, and a login request menu 612c are displayed.

Through these windows, the receiver terminal 300 collects and processes e-mail account information for receiver login input in the receiver login input window unit and login password information into member login information for a receiver and transmits the processed member login information for a receiver to the virtual currency transaction guide server 100.

The virtual currency transaction guide server 100 confirms that the receiver is a member by matching the received member login information for a receiver with the membership list information DB 111, subtracts an amount to be given to the receiver from block chain-based digital virtual currency amount information stored in electronic wallet information of the giver in the electronic wallet list information DB 112 on the basis of a transaction request signal for a giver, adds the subtracted amount to block chain-based digital virtual currency amount information stored in electronic wallet information of the receiver, generates transaction information for a digital virtual currency transaction on the basis of the subtraction and addition, and then controls the transaction information for a digital virtual currency transaction to be propagated to the block chain retention servers 400.

Finally, a non-member electronic wallet information input request item 613 displayed in the electronic wallet creation-specific payment selection list unit 610 of the receiver transaction guide screen 600 can be selected for the type in which a receiver creates an electronic wallet in another block chain-based digital virtual currency exchange server and the other block chain-based digital virtual currency exchange server manages the electronic wallet.

In other words, the non-member electronic wallet information input request item 613 is used for requesting a receiver having an electronic wallet to manually input his or her public address. As those additionally displayed when a receiver selects the non-member electronic wallet information input request item 613, the non-member electronic wallet information input request item 613 has a receiver public address input window 613a in which a public address included in an electronic wallet of the receiver is input and displayed and a send menu 613b. Since a receiver manually inputs his or her public address as described above, a giver can do a transaction of a digital virtual currency having a block chain with a receiver without recognizing a public address of the receiver.

The receiver terminal 300 transmits receiver public address information for a non-member input in the receiver public address input window 613a to the virtual currency transaction guide server 100.

The virtual currency transaction guide server 100 extracts electronic wallet information of the giver from the electronic wallet list information DB 112 on the basis of a transaction request signal for a giver, subtracts an amount to be given to the receiver from block chain-based digital virtual currency amount information stored in the extracted electronic wallet information of the giver, stores the electronic wallet information of the giver, generates transaction information for a digital virtual currency transaction on the basis of the electronic wallet information of the giver stored after the subtraction and the received receiver public address information for a non-member, and controls the transaction information for a digital virtual currency transaction to be propagated to the block chain retention servers 400.

The giver terminal 200 generates the transaction request signal for a giver including amount information of a digital virtual currency having a block chain to be given and personal information of the giver and transmits the transaction request signal for a giver to the digital virtual currency transaction guide server 100, and a giver-side block chain-based digital virtual currency transaction app 210 which guides the giver to designate a receiver who will receive the receiver transaction selecting URL A transmitted from the digital virtual currency transaction guide server 100 and transmit the receiver transaction selecting URL A to the designated receiver is installed in the giver terminal 200.

Here, the giver-side block chain-based digital virtual currency transaction app 210 is an application program. It is possible to access an app store through the giver terminal 200 and download and use the giver-side block chain-based digital virtual currency transaction app, or directly access the aforementioned block chain-based digital virtual currency transaction guide server 100 and download and use the giver-side block chain-based digital virtual currency transaction app.

Also, the giver terminal 200 includes an information input unit, such as a keypad, that generates a user input signal for controlling or operating the giver terminal 200 according to a user's manipulation to run the giver-side block chain-based digital virtual currency transaction app 210, an information storage unit that stores data, such as personal information of a giver which will be described below or the giver-side block chain-based digital virtual currency transaction app 210 which is a dedicate program, an information output unit 201 that outputs multimedia information, such as a block chain-based digital virtual currency transaction screen 510 which will be described below, and a control unit that performs overall control of the giver terminal 200. To clearly set bounds to the present invention, a reference sign is assigned to the information output unit 201 only, and this is the same for the receiver terminal 300 which will be described below.

The giver terminal 200 that performs such functions can be various terminals including a communication terminal device, such as a palmtop, a personal digital assistant (PDA), and an Internet-accessible smart phone, a portable multimedia player (PMP), an ultra-mobile PC, a mobile Internet device (MID), etc., and this is the same for the receiver terminal 300 which will be described below.

The receiver terminal 300 clicks the receiver transaction selecting URL A received from the giver terminal 200 and thereby requests payment of digital virtual currency having a block chain differently according to whether an electronic wallet has been created through the receiver transaction guide screen 600 received from the block chain-based digital virtual currency transaction guide server 100.

Also, the giver-side block chain-based digital virtual currency transaction app 210 of the giver terminal 200 is programmed to add selection information of a URL transmission means, which is selected by the giver as a means of transmitting the receiver transaction selecting URL A from among an instant messenger, a short message service (SMS), and e-mail, to the transaction request signal for a giver, to transmit the transaction request signal for a giver, to control the means selected by the giver from among the instant messenger, the SMS, and the e-mail to be automatically executed when the receiver transaction selecting URL A is received from the digital virtual currency transaction guide server 100, and to output the receiver transaction selecting URL A on the automatically executed means, so that the giver can transmit the receiver transaction selecting URL A to the receiver using the selected means.

To this end, the giver terminal 200 stores the block chain-based digital virtual currency transaction screen 510 including an amount display column 511 in which the amount of a digital virtual currency having a block chain to be given is displayed, a transmission means selection column 512 in which the instant messenger, the SMS, and the e-mail are displayed and one of the displayed instant messenger, SMS, and e-mail is selected by the giver as a means of transmitting the receiver transaction selecting URL A, a text input column 513 in which a message to be transferred to the receiver is input and displayed, and a transmission menu 514 for requesting data transmission.

The giver-side block chain-based digital virtual currency transaction app 210 of the giver terminal 200 is programmed to collect amount information of a digital virtual currency having a block chain displayed through the amount display column 511, selection information of a URL transmission means selected through the transmission means selection column 512, and the personal information of the giver and to generate the transaction request signal for a giver when the transmission menu 514 in the block chain-based digital virtual currency transaction screen 510 is clicked.

A process of guiding concerned parties to do a transaction of a digital virtual currency having a block chain between the concerned parties using the transaction system having the above-described configuration for a digital virtual currency having a block chain between concerned parties according to the present invention regardless of whether an electronic wallet required for a transaction of a digital virtual currency having a block chain has been created will be described below.

First, when a giver executes the giver-side block chain-based digital virtual currency transaction app 210 installed in the giver terminal 200 (S110), the executed giver-side block chain-based digital virtual currency transaction app 210 outputs and displays a block chain-based digital virtual currency transaction screen 510 through the information output unit 201 of the giver terminal 200 (S120).

Subsequently, when the giver inputs information to the amount display column 511, the transmission means selection column 512, and the text input column 513 displayed in the block chain-based digital virtual currency transaction screen 510 through the information output unit according to input formats and clicks the transmission menu 514, the giver-side block chain-based digital virtual currency transaction app 210 collects amount information of a digital virtual currency input through the block chain-based digital virtual currency transaction screen 510, selection information of a URL transmission means selected by the giver as a means of transmitting the receiver transaction selecting URL A from among an instant messenger, an SMS, and e-mail, and personal information of the giver, generates a transaction request signal for a giver, and transmits the transaction request signal for a giver to the block chain-based digital virtual currency transaction guide server 100 (S130). Here, it is assumed that an instant messenger has been selected for the URL transmission means selection information.

Subsequently, when the transaction request signal for a giver is received from the giver terminal 200, the block chain-based digital virtual currency transaction guide server 100 generates the receiver transaction selecting URL A for guiding a receiver who receives the digital virtual currency having a block chain to do a transaction of a digital virtual currency having a block chain regardless of whether the receiver has created an electronic wallet and transmits the receiver transaction selecting URL A to the giver terminal 200 (S140).

Figure 3:
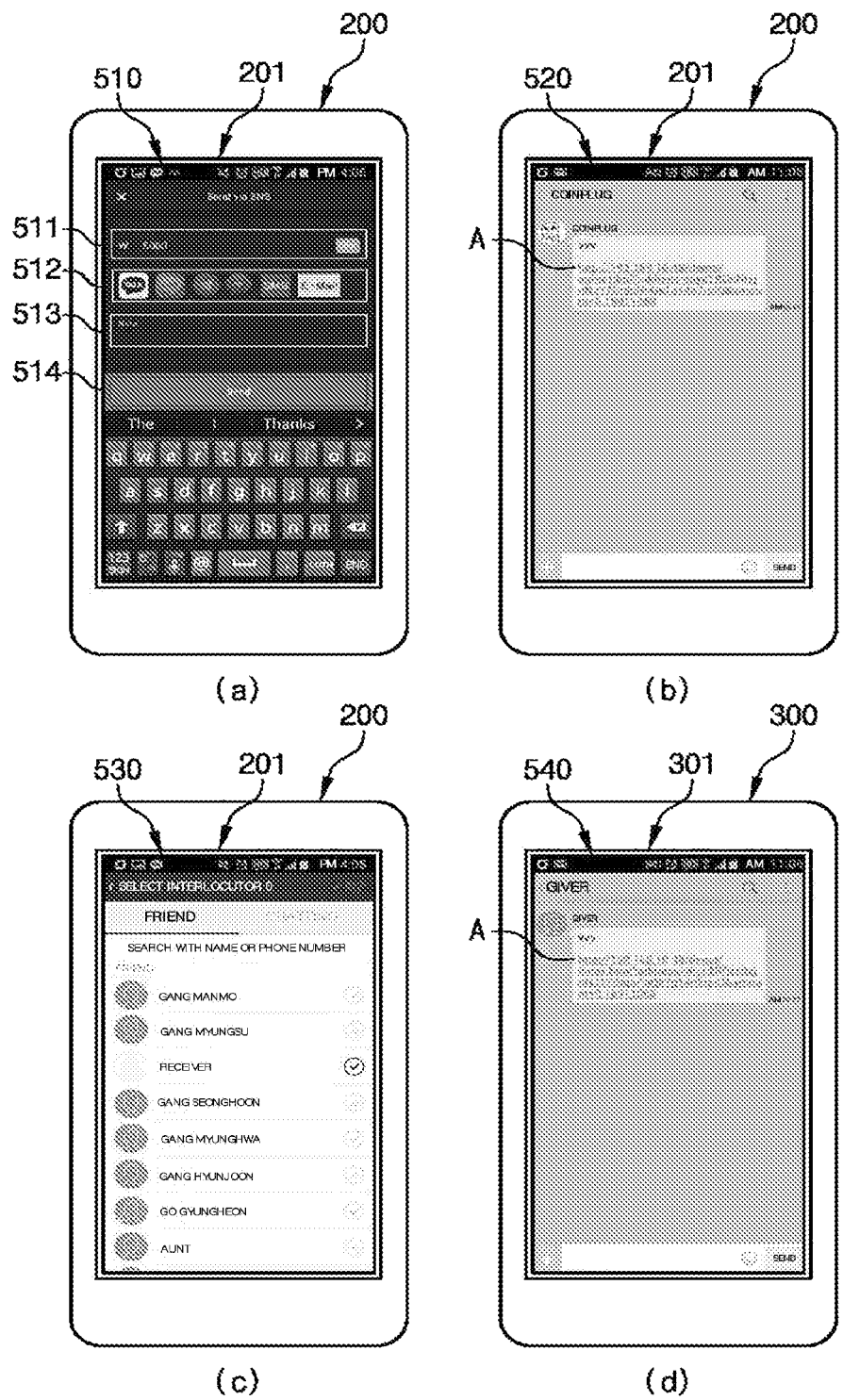
FIG. 3A is a diagram showing a block chain-based digital virtual currency transaction screen stored in a giver terminal among components constituting the transaction system for a digital virtual currency having a block chain between concerned parties according to the present invention.
FIG. 3B is a diagram showing a uniform resource locator (URL) display guide screen for a giver-side instant messenger in which a receiver transaction selecting URL is displayed in the giver-side instant messenger installed in a giver terminal during a transaction process of a digital virtual currency having a block chain between concerned parties using the transaction system for a digital virtual currency having a block chain between concerned parties according to the present invention.
FIG. 3C is a diagram showing a giver designation guide screen for a giver-side instant messenger for selecting a giver in the giver-side instant messenger installed in a giver terminal during a transaction process of a digital virtual currency having a block chain between concerned parties using the transaction system for a digital virtual currency having a block chain between concerned parties according to the present invention.
FIG. 3D is a diagram showing a URL display guide screen for a receiver-side instant messenger in which a receiver transaction selecting URL is displayed in the receiver-side instant messenger installed in a receiver terminal during a transaction process of a digital virtual currency having a block chain between concerned parties using the transaction system for a digital virtual currency having a block chain between concerned parties according to the present invention.

When the receiver transaction selecting URL A is received from the block chain-based digital virtual currency transaction guide server 100, the giver-side block chain-based digital virtual currency transaction app 210 of the giver terminal 200 controls an instant messenger which is a transmission means corresponding to the URL transmission means selection information among transmission means including an instant messenger, an SMS, and e-mail to be automatically executed and controls the receiver transaction selecting URL A to be output in the automatically executed instant messenger (see FIG. 3B) (S150).

Figure 4:
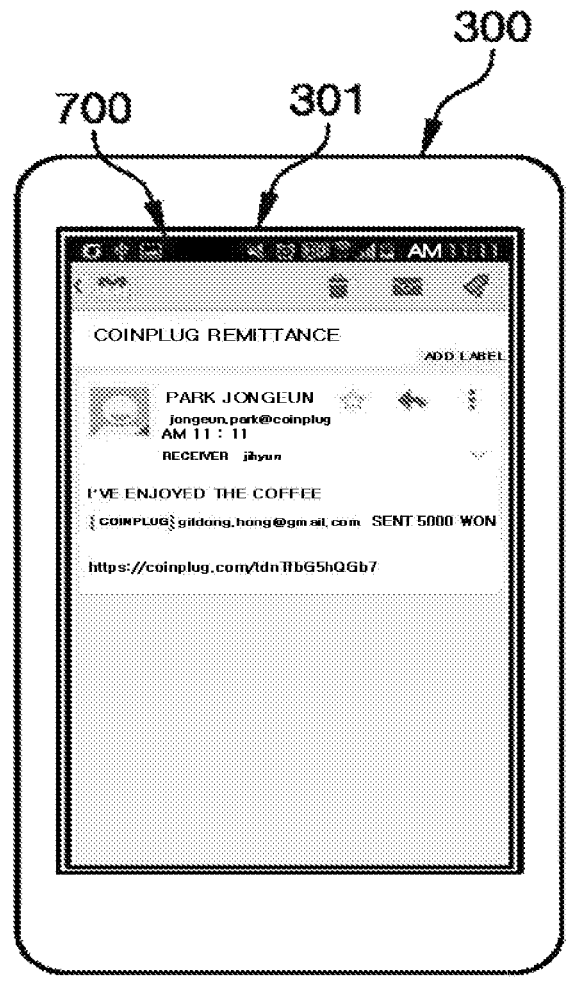
FIG. 4 is a diagram showing that a receiver transaction selecting URL is displayed in e-mail installed in a receiver terminal during a transaction process of a digital virtual currency having a block chain between concerned parties using the transaction system for a digital virtual currency having a block chain between concerned parties according to the present invention.

Here, if the giver has selected e-mail as the URL transmission means selection information, the giver-side block chain-based digital virtual currency transaction app 210 of the giver terminal 200 outputs and displays the received receiver transaction selecting URL A in a text input window while automatically executing e-mail. Therefore, even when the giver does not know a public address of an electronic wallet of the receiver, the giver simply inputs an e-mail address of the receiver, and the receiver receives the receiver transaction selecting URL A (see FIG. 4), so that a transaction can be made.

Figure 5:
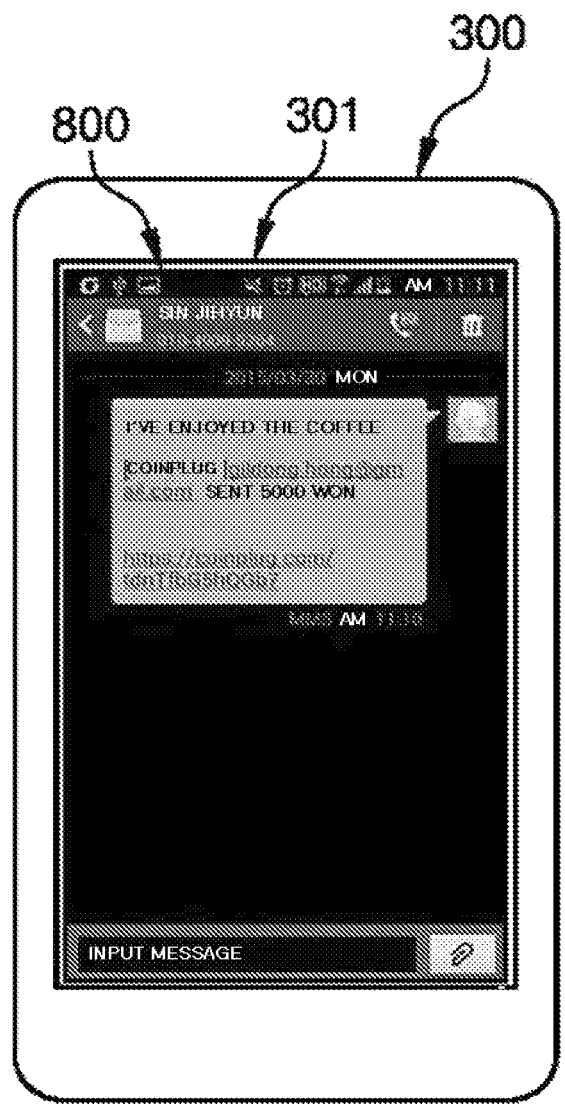
FIG. 5 is a diagram showing that a receiver transaction selecting URL is displayed in a short message service (SMS) installed in a receiver terminal during a transaction process of a digital virtual currency having a block chain between concerned parties using the transaction system for a digital virtual currency having a block chain between concerned parties according to the present invention.
Figure 6:
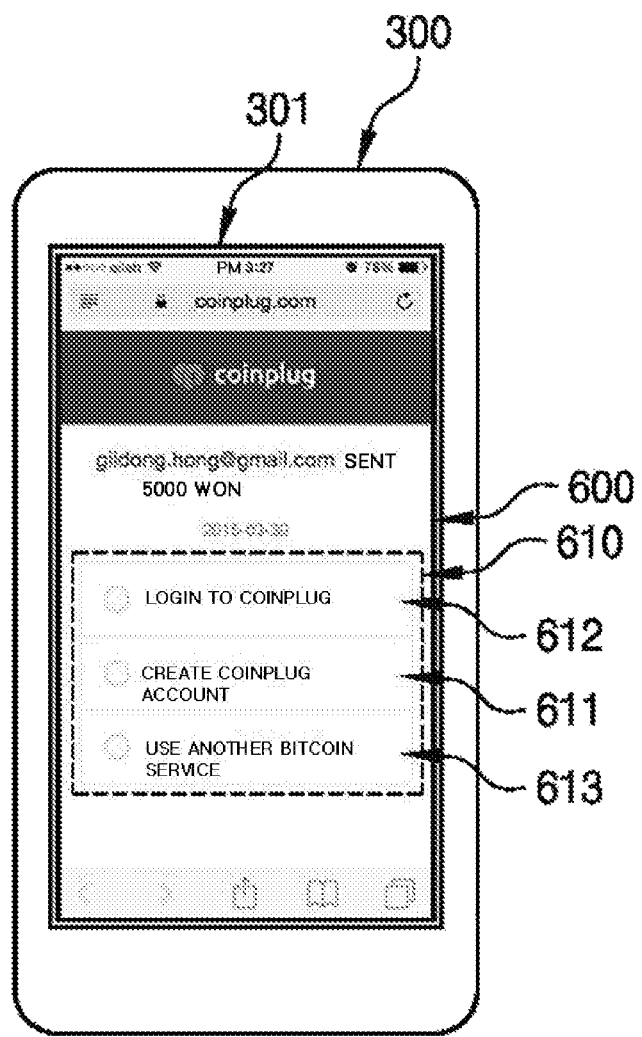
FIGS. 6 to 9 are diagrams showing receiver transaction guide screens stored in the block chain-based digital virtual currency transaction guide server among components constituting the transaction system for a digital virtual currency having a block chain between concerned parties according to the present invention.
Figure 7:
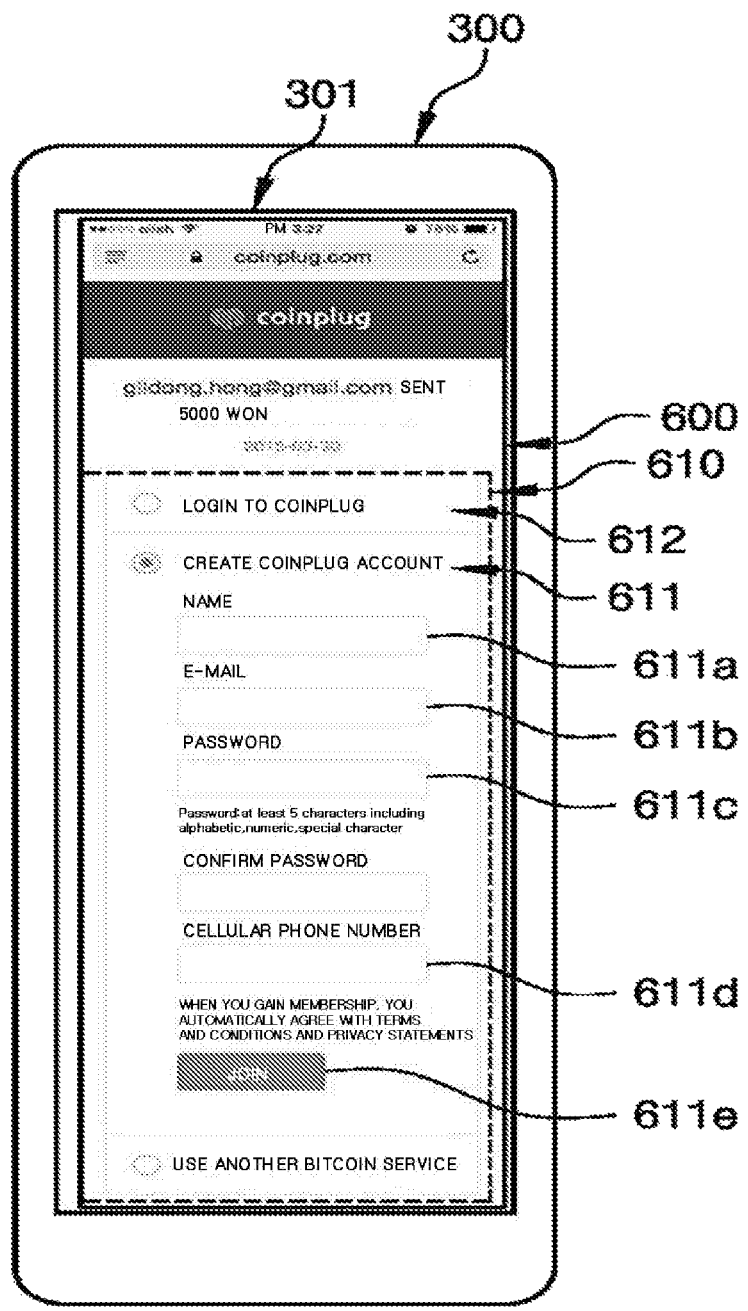
Figure 8:
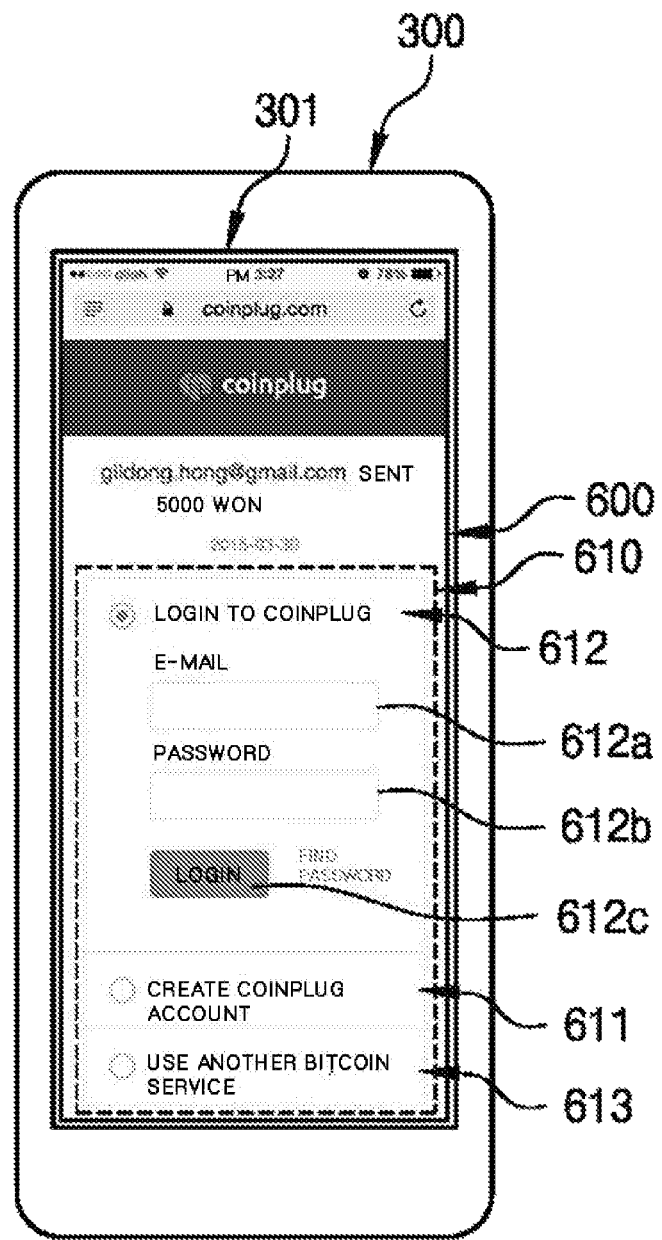
Figure 9:
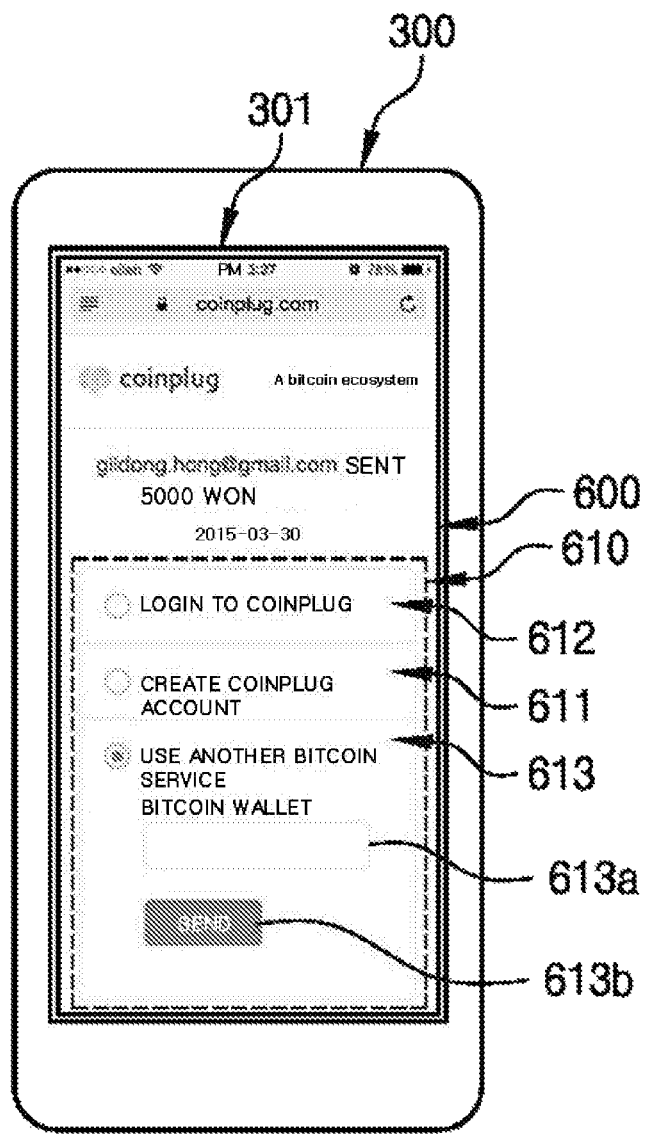
Figure 10:
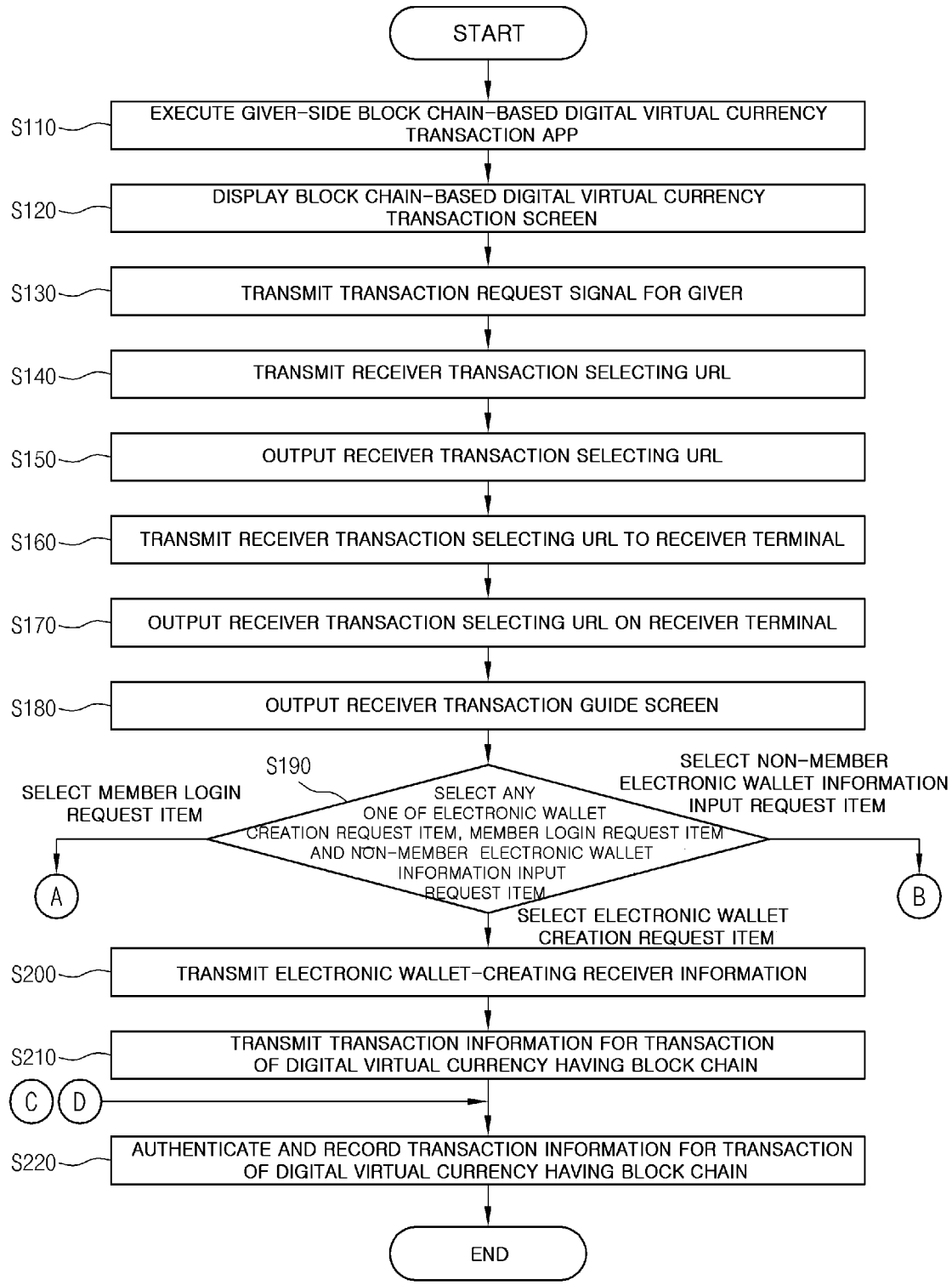
FIGS. 10 to 12 are flowcharts showing a process of guiding concerned parties to do a transaction of a digital virtual currency having a block chain between the concerned parties regardless of whether an electronic wallet required for a transaction of a digital virtual currency having a block chain has been created using the transaction system for a digital virtual currency having a block chain between concerned parties according to the present invention.
Figure 11:
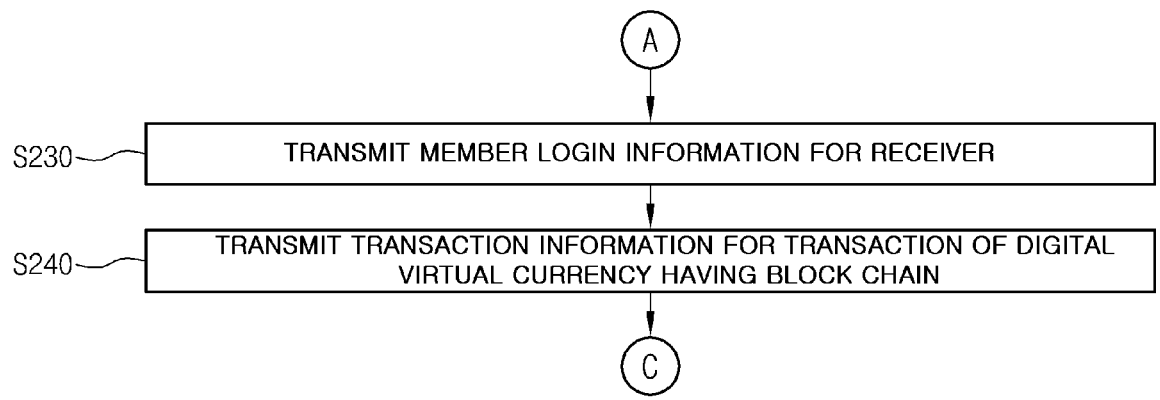
Figure 12:
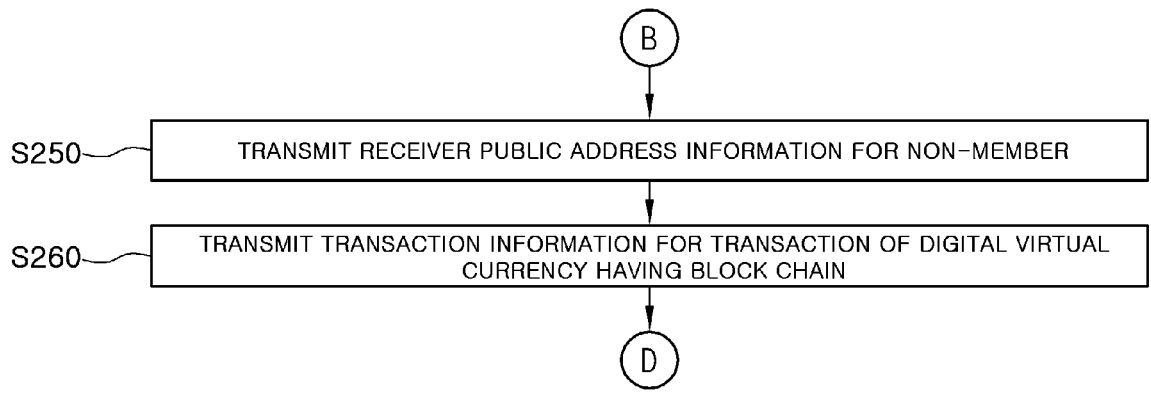

Also, if the giver has selected an SMS as the URL transmission means selection information, the giver-side block chain-based digital virtual currency transaction app 210 of the giver terminal 200 outputs and displays the received receiver transaction selecting URL A in the text input window while automatically executing the SMS. Therefore, even when the giver does not know the public address of the electronic wallet of the receiver, the giver simply inputs a mobile communication phone number of the receiver, and the receiver receives the receiver transaction selecting URL A (see FIG. 5), so that a transaction can be made.

Subsequently, when the giver designates a receiver account of the instant messenger that requests transfer of the receiver transaction selecting URL A through a giver designation guide screen (see FIG. 3C) for a giver-side instant messenger, the instant messenger, which is the automatically executed transmission means, installed in the giver terminal 200 transmits the receiver transaction selecting URL A to the receiver terminal 300 corresponding to the receiver account (S160).

Subsequently, the instant messenger which is the same transmission means of the giver terminal 200 is executed in the receiver terminal 300, and the executed instant messenger controls a URL display guide screen (see FIG. 3D) for a receiver-side instant messenger in which the received receiver transaction selecting URL A is inserted and displayed to be output through an information output unit 301 (S170).

Subsequently, when the receiver clicks the receiver transaction selecting URL A output and displayed in the instant messenger of the receiver terminal 300, the receiver terminal 300 requests transmission of the receiver transaction guide screen 600 corresponding to the receiver transaction selecting URL A from the block chain-based digital virtual currency transaction guide server 100 and controls the receiver transaction guide screen 600 received from the block chain-based digital virtual currency transaction guide server 100 to be output through the information output unit 301 (S180).

The receiver transaction guide screen 600 output in the receiver terminal 300 has the electronic wallet creation-specific payment selection list unit 610 for requesting payment of a digital virtual currency having a block chain differently according to whether an electronic wallet has been created. In the electronic wallet creation-specific payment selection list unit 610, the electronic wallet creation request item 611 used by a receiver who has not created an electronic wallet to request creation of an electronic wallet, the member login request item 612 used by a receiver who is managed as a member in the block chain-based digital virtual currency transaction guide server 100 to request login to the block chain-based digital virtual currency transaction guide server 100, and the non-member electronic wallet information input request item 613 for requesting manual input of a public address of a receiver having an electronic wallet are displayed, and the receiver selects an item suitable for himself or herself (S190).

First, when the receiver clicks and selects the electronic wallet creation request item 611 among the electronic wallet creation request item 611, the member login request item 612, and the non-member electronic wallet information input request item 613, the receiver terminal 300 generates electronic wallet-creating receiver information including receiver name information, receiver e-mail account information, password information, and receiver mobile communication phone number information input through the electronic wallet creation request item 611 and transmits the electronic wallet-creating receiver information to the virtual currency transaction guide server 100 (S200).

Subsequently, the virtual currency transaction guide server 100 creates an electronic wallet of the receiver on the basis of the received electronic wallet-creating receiver information, stores the electronic wallet in the electronic wallet list information DB 112, subtracts an amount to be given to the receiver from block chain-based digital virtual currency amount information stored in electronic wallet information of the giver in the electronic wallet list information DB 112 on the basis of the transaction request signal of a giver, adds the subtracted amount to block chain-based digital virtual currency amount information stored in electronic wallet information of the receiver, generates transaction information for a digital virtual currency transaction on the basis of the subtraction and addition, and transmits the transaction information for a digital virtual currency transaction to designated block chain retention servers 400 (S210).

Subsequently, when the transaction information for a transaction of a digital virtual currency having a block chain is received, each of the designated block chain retention servers 400 authenticates the block chain-based digital virtual currency transaction by verifying the received transaction information for a transaction of a digital virtual currency having a block chain and records the transaction information for a transaction of a digital virtual currency having a block chain according to the authentication (S220), thereby completing the authentication of the transaction.

Also, when the receiver selects the member login request item 612 among the electronic wallet creation request item 611, the member login request item 612, and the non-member electronic wallet information input request item 613, the receiver terminal 300 generates member login information for a receiver including e-mail account information for receiver login and password information for login input through the member login request item 612 and transmits the member login information for a receiver to the virtual currency transaction guide server 100 (S230).

The virtual currency transaction guide server 100 confirms that the receiver is a member by matching the received member login information for a receiver with the membership list information DB 111, subtracts the amount to be given to the receiver from the block chain-based digital virtual currency amount information stored in the electronic wallet information of the giver in the electronic wallet list information DB 112 on the basis of the transaction request signal for a giver, adds the subtracted amount to the block chain-based digital virtual currency amount information stored in the electronic wallet information of the receiver, generates transaction information for a digital virtual currency transaction on the basis of the subtraction and addition, and transmits the transaction information for a digital virtual currency transaction to designated block chain retention servers 400 (S240), so that the designated block chain retention servers 400 can authenticate the transaction by recording the transaction information for a transaction of a digital virtual currency having a block chain (S220).

Finally, when the receiver selects the non-member electronic wallet information input request item 613 among the electronic wallet creation request item 611, the member login request item 612, and the non-member electronic wallet information input request item 613, the receiver terminal 300 generates receiver public address information for a non-member indicating a public address which has been input through the non-member electronic wallet information input request item 613 and is included in the electronic wallet of the receiver and transmits the receiver public address information for a non-member to the virtual currency transaction guide server 100 (S250).

Subsequently, the virtual currency transaction guide server 100 extracts the electronic wallet information of the giver from the electronic wallet list information DB 112 on the basis of the transaction request signal for a giver, subtracts the amount to be given to the receiver from the block chain-based digital virtual currency amount information stored in the extracted electronic wallet information of the giver, stores the electronic wallet information of the giver, generates transaction information for a digital virtual currency transaction on the basis of the electronic wallet information of the giver stored after the subtraction and the received receiver public address information for a non-member, and transmits the transaction information for a digital virtual currency transaction to designated block chain retention servers 400 (S260), so that the designated block chain retention servers 400 can authenticate the transaction by recording the transaction information for a transaction of a digital virtual currency having a block chain (S220).

DESCRIPTIONS OF REFERENCE SIGNS

100: block chain-based digital virtual currency transaction guide server
110: DB unit
111: membership list information DB
112: electronic wallet list information DB
113: format list information DB
200: giver terminal
210: giver-side block chain-based digital virtual currency transaction app
201, 301: information output unit
300: receiver terminal
400: block chain retention server
510: block chain-based digital virtual currency transaction screen
511: amount display column
512: transmission means selection column
513: text input column
514: transmission menu
520: URL display guide screen for a giver-side instant messenger
530: giver designation guide screen for a giver-side instant messenger
540: URL display guide screen for a receiver-side instant messenger
600: receiver transaction guide screen
610: electronic wallet creation-specific payment selection list unit
611: electronic wallet creation request item
611a: name input window
611b: e-mail account input window
611c: password input window
611d: contact number input window
611e: complete menu
612: member login request item
612a: login e-mail account input window
612b: login password input window
612c: login request menu
613: non-member electronic wallet information input request item
613a: receiver public address input window
613b: send menu
A: receiver transaction selecting URL

What is claimed is:

1. A transaction system for a digital virtual currency having a block chain between concerned parties, the transaction system comprising:
a block chain-based digital virtual currency transaction guide server configured to:
receive a transaction request signal for a giver including amount information of a digital virtual currency having a block chain to be given and personal information of a giver,
upon receipt of the transaction request signal, generate and transmit a receiver transaction selecting uniform resource locator URL for guiding a receiver to do the transaction of a digital virtual currency having a block chain regardless of whether an electronic wallet has been created as required when the receiver makes the transaction of a digital virtual currency having a block chain, and transmit a receiver transaction guide screen provided through a click of the receiver transaction selecting URL and guiding the receiver to do the transaction of the digital virtual currency having a block chain differently according to whether the receiver has created an electronic wallet;

a giver terminal configured to:
  generate the transaction request signal for a giver including the amount information of the digital virtual currency having a block chain to be given and the personal information of the giver, and
  transmit the transaction request signal for a giver to the digital virtual currency transaction guide server, and in which a giver-side block chain-based digital virtual currency transaction app for guiding a giver to designate the receiver who will receive the receiver transaction selecting URL transmitted from the digital virtual currency transaction guide server and transmit the receiver transaction selecting URL is installed; and a receiver terminal configured to click the receiver transaction selecting URL received from the giver terminal and thereby request payment of the digital virtual currency having a block chain differently according to whether the electronic wallet has been created through the receiver transaction guide screen received from the block chain-based digital virtual currency transaction guide server.

2. The transaction system of claim 1, further comprising:
block chain retention servers configured to:
  receive transaction information for a transaction of a digital virtual currency having a block chain,
  upon receipt of the transaction information, authenticate a block chain-based digital virtual currency transaction by verifying the received transaction information for a transaction of a digital virtual currency having a block chain, and retain a block chain in which the transaction information for a transaction of a digital virtual currency having a block chain is recorded according to the authentication, wherein the block chain-based digital virtual currency transaction guide server includes a database (DB) unit having:
  a membership list information DB storing personal information of members including the members' e-mail accounts, passwords, phone numbers of mobile communication terminals, and addresses separately according to the members as information registered for a block chain-based digital virtual currency transaction when users become the members,
  an electronic wallet list information DB storing electronic wallets including public addresses of a digital virtual currency having a block chain created by the users who have become the members, private keys, and block chain-based digital virtual currency amount information separately according to the members, and
  a format list information DB storing the receiver transaction guide screen;

wherein the receiver transaction guide screen has an electronic wallet creation-specific payment selection list unit for requesting payment of a digital virtual currency having a block chain differently according to whether an electronic wallet has been created;

wherein the electronic wallet creation-specific payment selection list unit includes an electronic wallet creation request item used by a receiver who has not created an electronic wallet to request creation of an electronic wallet;

wherein the electronic wallet creation request item has a receiver personal information input window unit for creating an electronic wallet in which receiver-related information required to create an electronic wallet is input and displayed, as a window additionally displayed when the electronic wallet creation request item is selected;

wherein the receiver terminal collects and processes information input in the receiver personal information input window unit for creating an electronic wallet into electronic wallet-creating receiver information and transmits the processed electronic wallet-creating receiver information to the virtual currency transaction guide server; and wherein the virtual currency transaction guide server is further configured to:
  create an electronic wallet of the receiver based on the received electronic wallet-creating receiver information,
  store the electronic wallet in the electronic wallet list information DB,
  subtract the amount to be given to the receiver from block chain-based digital virtual currency amount information stored in electronic wallet information of the giver in the electronic wallet list information DB based on the transaction request signal for a giver,
  add the subtracted amount to block chain-based digital virtual currency amount information stored in electronic wallet information of the receiver,
  generate transaction information for a digital virtual currency transaction based on the subtraction and addition, and
  control the transaction information for a digital virtual currency transaction to be propagated to the block chain retention servers.

3. The transaction system of claim 2, wherein the receiver personal information input window unit for creating an electronic wallet includes a least one of a name input window in which the receiver's name is input and displayed, an e-mail account input window in which the receiver's e-mail account is input and displayed, a password input window in which a password is input and displayed, a contact number input window in which the receiver's mobile communication phone number is input and displayed, and
  the electronic wallet-creating receiver information includes at least one of receiver name information, receiver e-mail account information, password information, and receiver mobile communication phone number information.

4. The transaction system of claim 1, further comprising:
block chain retention servers configured to:
  receive transaction information for a transaction of a digital virtual currency having a block chain,
  upon receipt of the transaction information, authenticate a block chain-based digital virtual currency transaction by verifying the received transaction information for a transaction of a digital virtual currency having a block chain, and retain a block chain in which the transaction information for a transaction of a digital virtual currency having a block chain is recorded according to the authentication, wherein the block chain-based digital virtual currency transaction guide server includes a database (DB) unit having:
- a membership list information DB storing personal information of members including the members' e-mail accounts, passwords, phone numbers of mobile communication terminals, and addresses separately according to the members as information registered for a block chain-based digital virtual currency transaction when users become the members,
- an electronic wallet list information DB storing electronic wallets including public addresses of a digital virtual currency having a block chain created by the users who have become the members, private keys, and block chain-based digital virtual currency amount information separately according to the members, and
- a format list information DB storing the receiver transaction guide screen;

wherein the receiver transaction guide screen has an electronic wallet creation-specific payment selection list unit for requesting payment of a digital virtual currency having a block chain differently according to whether an electronic wallet has been created;

wherein the electronic wallet creation-specific payment selection list unit includes a member login request item used by a receiver who is managed as a member in the block chain-based digital virtual currency transaction guide server to request login to the block chain-based digital virtual currency transaction guide server;

wherein the member login request item has a receiver login input window unit in which receiver login information required by a member for login is input and displayed, as a window additionally displayed when the member login request item is selected;

wherein the receiver terminal collects and processes information input in the receiver login input window unit into member login information for a receiver and transmits the processed member login information for a receiver to the virtual currency transaction guide server; and wherein the virtual currency transaction guide server is further configured to:
- confirm that the receiver is a member by matching the received member login information for a receiver with the membership list information DB,
- subtract the amount to be given to the receiver from block chain-based digital virtual currency amount information stored in electronic wallet information of the giver in the electronic wallet list information DB based on the transaction request signal for a giver,
- add the subtracted amount to block chain-based digital virtual currency amount information stored in electronic wallet information of the receiver, generates transaction information for a digital virtual currency transaction based on the subtraction and addition, and
- control the transaction information for a digital virtual currency transaction to be propagated to the block chain retention servers.

5. The transaction system of claim 4, wherein the receiver login input window unit includes a login e-mail account input window in which the receiver's e-mail account is input and displayed and a login password input window in which a password is input and displayed, and
the member login information for a receiver includes e-mail account information for receiver login and password information for login.

6. The transaction system of claim 1, further comprising:
block chain retention servers configured to:
- receive transaction information for a transaction of a digital virtual currency having a block chain,
- upon receipt of the transaction information, authenticate a block chain-based digital virtual currency transaction by verifying the received transaction information for a transaction of a digital virtual currency having a block chain, and retain a block chain in which the transaction information for a transaction of a digital virtual currency having a block chain is recorded according to the authentication, wherein the block chain-based digital virtual currency transaction guide server includes a database (DB) unit having:
- a membership list information DB storing personal information of members including the members' e-mail accounts, passwords, phone numbers of mobile communication terminals, and addresses separately according to the members as information registered for a block chain-based digital virtual currency transaction when users become the members,
- an electronic wallet list information DB storing electronic wallets including public addresses of a digital virtual currency having a block chain created by the users who have become the members, private keys, and block chain-based digital virtual currency amount information separately according to the members, and
- a format list information DB storing the receiver transaction guide screen;

wherein the receiver transaction guide screen has an electronic wallet creation-specific payment selection list unit for requesting payment of a digital virtual currency having a block chain differently according to whether an electronic wallet has been created;

wherein the electronic wallet creation-specific payment selection list unit includes a non-member electronic wallet information input request item for requesting manual input of a public address of a receiver having an electronic wallet;

wherein the non-member electronic wallet information input request item has a receiver public address input window in which a public address included in an electronic wallet of the receiver is input and displayed, as a window additionally displayed when the non-member electronic wallet information input request item is selected;

wherein the receiver terminal transmits receiver public address information for a non-member input in the receiver public address input window to the virtual currency transaction guide server; and wherein the virtual currency transaction guide server is further configured to:
- extract electronic wallet information of the giver from the electronic wallet list information DB based on the transaction request signal for a giver,
- subtract the amount to be given to the receiver from block chain-based digital virtual currency amount information stored in the extracted electronic wallet information of the giver, stores the electronic wallet information of the giver,
generate transaction information for a digital virtual currency transaction based on the electronic wallet information of the giver stored after the subtraction and the received receiver public address information for a non-member, and
control the transaction information for a digital virtual currency transaction to be propagated to the block chain retention servers.

7. The transaction system of claim 1, wherein the giver-side block chain-based digital virtual currency transaction app of the giver terminal is configured to:
add selection information of a URL transmission means, which is selected by the giver as a means of transmitting the receiver transaction selecting URL from among an instant messenger, a short message service (SMS), and e-mail, to the transaction request signal for a giver,
transmit the transaction request signal for a giver,
receive the receiver transaction selecting URL from the digital virtual currency transaction guide server;
upon receipt of the receiver transaction selecting URL, control the means selected by the giver from among an instant messenger, an SMS, and e-mail to be automatically executed, and
output the receiver transaction selecting URL in the automatically executed means, so that the giver can transmit the receiver transaction selecting URL to the receiver using the selected means.

8. The transaction system of claim 7, wherein the giver terminal stores a block chain-based digital virtual currency transaction screen including:
an amount display column in which the amount of the digital virtual currency having a block chain to be given is displayed,
a transmission means selection column in which an instant messenger, an SMS, and e-mail are displayed and one of the displayed instant messenger, SMS, and e-mail is selected by the giver as the means of transmitting the receiver transaction selecting URL, and
a transmission menu for requesting data transmission, and when the transmission menu in the block chain-based digital virtual currency transaction screen is clicked, the giver-side block chain-based digital virtual currency transaction app of the giver terminal collects the amount information of the digital virtual currency having a block chain displayed through the amount display column, the selection information of the URL transmission means selected through the transmission means selection column, and the personal information of the giver and generates the transaction request signal for a giver.

9. The transaction system of claim 1, wherein the digital virtual currency having a block chain is any one of Bitcoin, Litecoin, Darkcoin, Namecoin, Dogecoin, and Ripple.

10. A transaction method for a digital virtual currency having a block chain between concerned parties, the transaction method comprising:
executing a giver-side block chain-based digital virtual currency transaction app run in a giver terminal;
displaying, by the executed giver-side block chain-based digital virtual currency transaction app, a block chain-based digital virtual currency transaction screen in the giver terminal;
generating, by the giver-side block chain-based digital virtual currency transaction app, a transaction request signal for a giver including:
amount information of a digital virtual currency input through the block chain-based digital virtual currency transaction screen,
selection information of a uniform resource locator (URL) transmission means selected by a giver as a means of transmitting a receiver transaction selecting URL from among an instant messenger, a short message service (SMS), and
e-mail, and personal information of the giver, and transmitting the transaction request signal for a giver to a block chain-based digital virtual currency transaction guide server;
receiving the transaction request signal for a giver from the giver terminal;
upon receipt of the transaction request signal, generating, by the block chain-based digital virtual currency transaction guide server, the receiver transaction selecting URL for guiding a receiver who receives the digital virtual currency having a block chain to do a transaction of a digital virtual currency having a block chain regardless of whether the receiver has created an electronic wallet, and transmitting the receiver transaction selecting URL to the giver terminal;
receiving, from the block chain-based digital virtual currency transaction guide server, the receiver transaction selecting URL;
upon receipt of the receiver transaction selecting URL, controlling, by the giver-side block chain-based digital virtual currency transaction app of the giver terminal, a transmission means corresponding to the selection information of the URL transmission means among transmission means including the instant messenger, the SMS, and the e-mail to be automatically executed;
controlling the receiver transaction selecting URL to be output in the automatically executed transmission means;
transmitting, by the automatically executed transmission means, the receiver transaction selecting URL to a receiver terminal corresponding to the receiver when the giver designates the receiver requesting transfer of the receiver transaction selecting URL in the automatically executed transmission means and requests transmission;
outputting, by the receiver terminal, the received receiver transaction selecting URL through a transmission means identical to the transmission means of the giver terminal;
clicking, in the receiver terminal, the receiver transaction selecting URL on the transmission means;
upon clicking of the receiver transaction selecting URL, requesting, by the receiver terminal, transmission of a receiver transaction guide screen corresponding to the receiver transaction selecting URL from the block chain-based digital virtual currency transaction guide server, and thereby outputting the receiver transaction guide screen received from the block chain-based digital virtual currency transaction guide server;
checking which one of an electronic wallet creation request item used by a receiver who has not created an electronic wallet to request creation of an electronic wallet, a member login request item used by a receiver who is managed as a member in the block chain-based digital virtual currency transaction guide server to request login to the block chain-based digital virtual currency transaction guide server, and a non-member electronic wallet information input request item for requesting manual input of a public address of a receiver having an electronic wallet is selected, outputting, in the receiver terminal, the receiver transaction guide screen having an electronic wallet creation-specific payment selection list unit for requesting payment of a digital virtual currency having a block chain differently according to whether an electronic wallet has been created, and displaying, by the electronic wallet creation-specific payment selection list unit, the electronic wallet creation request item, the member login request item, and the non-member electronic wallet information input request item;

selecting the electronic wallet creation request item from among the electronic wallet creation request item, the member login request item, and the non-member electronic wallet information input request item;

upon selection of the electronic wallet creation request item, generating, by the receiver terminal, electronic wallet-creating receiver information including at least one of receiver name information, receiver e-mail account information, password information, and receiver mobile communication phone number information input through the electronic wallet creation request item, and transmitting the electronic wallet-creating receiver information to the virtual currency transaction guide server;

creating, by the virtual currency transaction guide server, an electronic wallet of the receiver based on the received electronic wallet-creating receiver information, storing the electronic wallet in an electronic wallet list information DB, subtracting an amount to be given to the receiver from block chain-based digital virtual currency amount information stored in electronic wallet information of the giver in the electronic wallet list information DB based on the transaction request signal of a giver, adding the subtracted amount to block chain-based digital virtual currency amount information stored in electronic wallet information of the receiver, generating transaction information for a digital virtual currency transaction based on the subtraction and addition, and transmitting the transaction information for a digital virtual currency transaction to designated block chain retention servers; and receiving the transaction information for a transaction of a digital virtual currency having a block chain;

upon receipt of the transaction information, authenticating, by each of the designated block chain retention servers, the block chain-based digital virtual currency transaction by verifying the received transaction information for a transaction of a digital virtual currency having a block chain, and recording the transaction information for a transaction of a digital virtual currency having a block chain according to the authentication.

11. The transaction method of claim 10, further comprising, selecting the member login request item from among the electronic wallet creation request item, the member login request item, and the non-member electronic wallet information input request item during the checking which one of the electronic wallet creation request item used by a receiver who has not created an electronic wallet to request creation of an electronic wallet, the member login request item used by a receiver who is managed as a member in the block chain-based digital virtual currency transaction guide server to request login to the block chain-based digital virtual currency transaction guide server, and the non-member electronic wallet information input request item for requesting manual input of a public address of a receiver having an electronic wallet is selected, outputting, in the receiver terminal, the receiver transaction guide screen having the electronic wallet creation-specific payment selection list unit for requesting payment of a digital virtual currency having a block chain differently according to whether an electronic wallet has been created, and the electronic wallet creation-specific payment selection list unit displaying the electronic wallet creation request item, the member login request item, and the non-member electronic wallet information input request item;

generating, by the receiver terminal, member login information for a receiver including e-mail account information for receiver login and password information for login input through the member login request item and transmitting the member login information for a receiver to the virtual currency transaction guide server;

confirming, by the virtual currency transaction guide server, that the receiver is a member by:
matching the received member login information for a receiver with a membership list information DB,
subtracting the amount to be given to the receiver from the block chain-based digital virtual currency amount information stored in the electronic wallet information of the giver in the electronic wallet list information DB based on the transaction request signal for a giver,
adding the subtracted amount to the block chain-based digital virtual currency amount information stored in the electronic wallet information of the receiver,
generating transaction information for a digital virtual currency transaction based on the subtraction and addition, and
transmitting the transaction information for a digital virtual currency transaction to the designated block chain retention servers;

when the transaction information for a transaction of a digital virtual currency having a block chain is thereafter transmitted to each of the designated block chain retention servers and the non-member electronic wallet information input request item is selected from among the electronic wallet creation request item, the member login request item, and the non-member electronic wallet information input request item during the checking which one of the electronic wallet creation request item used by a receiver who has not created an electronic wallet to request creation of an electronic wallet, the member login request item used by a receiver who is managed as a member in the block chain-based digital virtual currency transaction guide server to request login to the block chain-based digital virtual currency transaction guide server, and the non-member electronic wallet information input request item for requesting manual input of a public address of a receiver having an electronic wallet is selected, the receiver transaction guide screen output in the receiver terminal having the electronic wallet creation-specific payment selection list unit for requesting payment of a digital virtual currency having a block chain differently according to whether an electronic wallet has been created, and the electronic wallet creation-specific payment selection list unit displaying the electronic wallet creation request item, the member login request item, and the non-member electronic wallet information input request item, generating, by the receiver terminal, receiver public address information for a non-member indicating a public address which has been input through the non-member electronic wallet information input request item and is included in the electronic wallet of the receiver and transmitting the receiver public address information for a non-member to the virtual currency transaction guide server;

extracting, by the virtual currency transaction guide server, the electronic wallet information of the giver from the electronic wallet list information DB based on the transaction request signal for a giver, subtracting the amount to be given to the receiver from the block chain-based digital virtual currency amount information stored in the extracted electronic wallet information of the giver, storing the electronic wallet information of the giver, generating transaction information for a digital virtual currency transaction based on the electronic wallet information of the giver stored after the subtraction and the received receiver public address information for a non-member, and transmitting the transaction information for a digital virtual currency transaction to the designated block chain retention servers; and when the transaction information for a transaction of a digital virtual currency having a block chain is thereafter received, proceeding to the authenticating, by each of the designated block chain retention servers, the block chain-based digital virtual currency transaction by verifying the received transaction information for a transaction of a digital virtual currency having a block chain and recording the transaction information for a transaction of a digital virtual currency having a block chain according to the authentication.

12. The transaction method of claim 10, further comprising, selecting the non-member electronic wallet information input request item from among the electronic wallet creation request item, the member login request item, and the non-member electronic wallet information input request item during the checking which one of the electronic wallet creation request item used by a receiver who has not created an electronic wallet to request creation of an electronic wallet, the member login request item used by a receiver who is managed as a member in the block chain-based digital virtual currency transaction guide server to request login to the block chain-based digital virtual currency transaction guide server, and the non-member electronic wallet information input request item for requesting manual input of a public address of a receiver having an electronic wallet is selected, outputting, in the receiver terminal, the receiver transaction guide screen having the electronic wallet creation-specific payment selection list unit for requesting payment of a digital virtual currency having a block chain differently according to whether an electronic wallet has been created, and the electronic wallet creation-specific payment selection list unit displaying the electronic wallet creation request item, the member login request item, and the non-member electronic wallet information input request item;

generating, by the receiver terminal, receiver public address information for a non-member indicating a public address which has been input through the non-member electronic wallet information input request item and is included in the electronic wallet of the receiver and transmitting the receiver public address information for a non-member to the virtual currency transaction guide server;

extracting, by the virtual currency transaction guide server, the electronic wallet information of the giver from the electronic wallet list information DB based on the transaction request signal for a giver, subtracting the amount to be given to the receiver from the block chain-based digital virtual currency amount information stored in the extracted electronic wallet information of the giver, storing the electronic wallet information of the giver, generating transaction information for a digital virtual currency transaction based on the electronic wallet information of the giver stored after the subtraction and the received receiver public address information for a non-member, and transmitting the transaction information for a digital virtual currency transaction to the designated block chain retention servers; and when the transaction information for a transaction of a digital virtual currency having a block chain is thereafter received, proceeding to the authenticating, by each of the designated block chain retention servers, the block chain-based digital virtual currency transaction by verifying the received transaction information for a transaction of a digital virtual currency having a block chain and recording the transaction information for a transaction of a digital virtual currency having a block chain according to the authentication.

13. The transaction method of claim 10, wherein the digital virtual currency having a block chain is any one of Bitcoin, Litecoin, Darkcoin, Namecoin, Dogecoin, and Ripple.

* * * * *